United States Patent
Geen

(10) Patent No.: US 6,845,665 B2
(45) Date of Patent: Jan. 25, 2005

(54) MICRO-MACHINED MULTI-SENSOR PROVIDING 2-AXES OF ACCELERATION SENSING AND 1-AXIS OF ANGULAR RATE SENSING

(75) Inventor: John A. Geen, Tewksbury, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/462,541

(22) Filed: Jun. 16, 2003

(65) Prior Publication Data

US 2004/0211256 A1 Oct. 28, 2004

Related U.S. Application Data

(60) Provisional application No. 60/466,126, filed on Apr. 28, 2003.

(51) Int. Cl.[7] .................................................. G01P 9/04
(52) U.S. Cl. .................................. 73/504.04; 73/504.12
(58) Field of Search ........................ 73/504.04, 504.12, 73/504.16, 504.14, 510

(56) References Cited

U.S. PATENT DOCUMENTS

| | | | |
|---|---|---|---|
| 4,715,227 A | 12/1987 | Pittman | 73/504 |
| 4,744,248 A | 5/1988 | Stewart | 73/505 |
| 4,744,249 A | 5/1988 | Stewart | 73/505 |
| 4,841,773 A | 6/1989 | Stewart | 73/510 |
| 5,007,279 A | 4/1991 | Miall | 72/394 |
| 5,313,835 A | 5/1994 | Dunn | 73/505 |
| 5,392,650 A | 2/1995 | O'Brien et al. | 73/517 |
| 5,590,460 A | 1/1997 | DiStefano et al. | 29/830 |
| 5,712,426 A | 1/1998 | Sapuppo et al. | 73/504.03 |
| 5,869,760 A | 2/1999 | Geen | 73/504.12 |
| 5,894,091 A * | 4/1999 | Kubota | 73/504.12 |
| 6,305,222 B1 | 10/2001 | Johnson et al. | 73/504.12 |
| 6,308,569 B1 | 10/2001 | Stewart | 73/514.32 |
| 6,508,122 B1 | 1/2003 | McCall et al. | 73/504.12 |

OTHER PUBLICATIONS

*Single chip Surface Micromachined Integrated Gyroscope with 50 deg./hour Allan Deviation,* Geen, John A.; Sherman, Steven J.; Chang, John F.; Lewis, Stephen R.; IEEE Journal of Solid–State Circuits, v 37, n 12, Dec. 2002, p 1860–1866.

* cited by examiner

*Primary Examiner*—John E. Chapman
(74) *Attorney, Agent, or Firm*—Weingarten, Schurgin, Gagnebin & Lebovici LLP

(57) ABSTRACT

A micro-machined multi-sensor that provides 2-axes of acceleration sensing and 1-axis of angular rate sensing. The multi-sensor includes a rigid accelerometer frame, a first proof mass, and a second proof mass. The substrate has two associated acceleration axes in the plane of the substrate, and one associated rotation axis perpendicular to the acceleration axes. The proof masses have a common vibration axis, which is perpendicular to the rotation axis. The multi-sensor further includes a drive electrode structure for causing the proof masses to vibrate in antiphase, a first pair of acceleration sense electrode structures disposed along one of the acceleration axes, and a second pair of acceleration sense electrode structures disposed along the other acceleration axis. The multi-sensor adds the sense signals provided by the respective sense electrode pairs to extract information pertaining to acceleration sensing along the acceleration axes, and adds the differences of the sense signals provided by the respective sense electrode pairs to extract information pertaining to angular rate sensing relative to the rotation axis.

25 Claims, 4 Drawing Sheets

MICRO-MACHINED MULTI-SENSOR PROVIDING 2-AXES OF ACCELERATION SENSING AND 1-AXIS OF ANGULAR RATE SENSING

CROSS REFERENCE TO RELATED APPLICATIONS

This application claims priority of U.S. Provisional Patent Application No. 60/466,126 filed Apr. 28, 2003 entitled MICROMACHINED MULTISENSOR PROVIDING 2-AXES OF ACCELERATION SENSING AND 1-AXIS OF ANGULAR RATE SENSING.

STATEMENT REGARDING FEDERALLY SPONSORED RESEARCH OR DEVELOPMENT

N/A

BACKGROUND OF THE INVENTION

The present invention relates generally to integrated acceleration and angular rate sensors ("multi-sensors"), and more specifically to a silicon micro-machined multi-sensor capable of providing 2-axes of acceleration sensing and 1-axis of angular rate sensing.

Silicon micro-machined multi-sensors are known that comprise at least one accelerometer for providing an indication of acceleration sensing and/or angular rate sensing in a single sensor device. A conventional silicon micro-machined multi-sensor, such as the silicon micro-machined multi-sensor described in U.S. Pat. No. 5,392,650 issued Feb. 28, 1995 entitled MICRO-MACHINED ACCELEROMETER GYROSCOPE, comprises a pair of accelerometers, in which each accelerometer includes a respective accelerometer frame and a respective proof mass suspended from the frame by a plurality of flexures. The conventional micro-machined multi-sensor has a single acceleration-sensing axis, and a single rotation-sensing axis perpendicular to the acceleration axis, associated therewith. Further, the conventional micro-machined multi-sensor is configured to vibrate the respective proof masses in antiphase along a vibration axis, which is perpendicular to the acceleration and rotation axes.

In a typical mode of operation, the conventional silicon micro-machined multi-sensor balances forces of linear acceleration upon the respective proof masses by a first set of electrical restoring forces, which are a function of the linear acceleration of the proof mass along the acceleration axis. The conventional micro-machined multi-sensor is further configured to balance Coriolis forces upon the respective proof masses by a second set of electrical restoring forces, which are a function of the Coriolis acceleration of the proof mass along an axis perpendicular to the rotation and vibration axes. The Coriolis acceleration of each of the proof masses results from the combination of the vibration of the proof masses along the vibration axis, and an applied angular rotation of the proof masses about the rotation axis.

Because the proof masses included in the conventional silicon micro-machined multi-sensor are typically made to vibrate in antiphase, the responses of the proof masses to linear acceleration are in phase, while the responses of the proof masses to Coriolis acceleration are in antiphase. Accordingly, the conventional micro-machined multi-sensor is configured to add the outputs of the respective accelerometers to extract information corresponding to the linear acceleration (i.e., the acceleration sensing information), and to subtract the respective accelerometer outputs to extract information corresponding to the Coriolis acceleration (i.e., the angular rate sensing information).

The above-described conventional micro-machined multi-sensor is typically fabricated separately from its electronics by a process known as bulk micro-machining, which is a relatively expensive process for fabricating micro-machined devices. There are other micro-machining fabrication processes that are generally less expensive than bulk micro-machining such as surface micro-machining with integrated electronics. For example, a conventional surface micro-machined gyroscope is described in U.S. Pat. No. 6,122,961 issued Sep. 26, 2000 entitled MICRO-MACHINED GYROS. That conventional micro-machined gyroscope device may be configured to add as well as subtract the outputs of its Coriolis accelerometers to yield an axis of linear acceleration in the plane of the substrate (i.e., tilt), and a gyroscopic axis perpendicular to the substrate plane (i.e., yaw).

However, the above-described conventional surface micro-machined gyroscope also has drawbacks. For example, the proof masses included therein are suspended from separate accelerometer frames. As a result, there is typically at least a slight mismatch in the resonant frequencies of the respective proof masses, which can make it difficult to generate sufficient drive for vibrating the proof masses at velocities high enough to obtain detectable Coriolis accelerations. Further, having separate accelerometer frames in the micro-machined multi-sensor device generally makes it harder to center the device on a die. Distortions in the die surface area may therefore be asymmetrical relative to the micro-machined device, which can degrade the overall performance of the multi-sensor. Another drawback is that this device generally provides only 1-axis of accelerometer tilt sensing and/or 1-axis of gyroscopic yaw sensing. However, it is often advantageous to have more than one axis of acceleration and/or rate sensing in a single sensor device.

It would therefore be desirable to have a silicon micro-machined multi-sensor that provides more than one axis of acceleration sensing and/or angular rate sensing, and avoids the drawbacks of the above-described conventional micro-machined multi-sensors.

BRIEF SUMMARY OF THE INVENTION

In accordance with the present invention, a micro-machined multi-sensor is disclosed that provides 2-axes of acceleration sensing and 1-axis of angular rate sensing in a device configuration that is relatively easy to center on a die. The presently disclosed micro-machined multi-sensor includes at least one pair of accelerometers that provide electrically independent sense signals, while sharing a common accelerometer frame and a common vibration axis.

In one embodiment, the micro-machined multi-sensor includes a rigid accelerometer frame, a first proof mass, and a second proof mass, each mass being formed on a silicon substrate. The substrate has two associated, mutually orthogonal acceleration-sensing axes in the plane of the substrate, and one associated rotation-sensing axis perpendicular to the two acceleration axes. The first and second proof masses have a common axis of symmetry along a vibration axis, which is perpendicular to the rotation axis. Further, the first and second proof masses are resiliently coupled to one another along the vibration axis. The first and second proof masses are suspended from the rigid frame by respective pluralities of first flexures, and the rigid frame is anchored to the substrate by a plurality of second flexures.

The first and second flexures are configured to constrain the first and second proof masses to move substantially only in the direction of the vibration axis relative to the rigid frame, and to constrain the rigid frame to move in a linear and rotational manner relative to the substrate.

In the presently disclosed embodiment, the micro-machined multi-sensor comprises a drive electrode structure configured to cause the first and second proof masses to vibrate in antiphase along the vibration axis. The micro-machined multi-sensor further comprises a first pair of diametrically opposed acceleration sense electrode structures coupled to the rigid frame and disposed along a first one of the acceleration axes, and a second pair of diametrically opposed acceleration sense electrode structures coupled to the rigid frame and disposed along a second one of the acceleration axes. The micro-machined multi-sensor is configured (1) to add the sense signals provided by the first sense electrode pair to extract information pertaining to acceleration sensing along the first acceleration axis, (2) to add the sense signals provided by the second sense electrode pair to extract information pertaining to acceleration sensing along the second acceleration axis, and (3) to add the difference of the sense signals provided by the first sense electrode pair and the difference of the sense signals provided by the second sense electrode pair to extract information pertaining to angular rate sensing relative to the rotation axis.

By configuring the micro-machined multi-sensor to provide two pairs of electrically independent acceleration sense signals along two respective, mutually orthogonal acceleration axes in the plane of the silicon substrate, 2-axes of acceleration sensing and 1-axis of angular rate sensing can be obtained by suitably adding and/or subtracting the sense signals. Further, by configuring the micro-machined multi-sensor so that the first and second proof masses vibrate in antiphase along a common vibration axis, while being suspended from a common accelerometer frame, the multi-sensor device has two orthogonal mirror symmetries and can therefore be more easily centered on a die. In this way, the adverse effects of die surface area distortions can be reduced.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

U.S. Provisional Patent Application No. 60/466,126 filed Apr. 28, 2003 entitled MICROMACHINED MULTISENSOR PROVIDING 2-AXES OF ACCELERATION SENSING AND 1-AXIS OF ANGULAR RATE SENSING is incorporated herein by reference.

A micro-machined multi-sensor is disclosed that provides 2-axes of acceleration sensing and 1-axis of angular rate sensing in a single multi-sensor device. The presently disclosed micro-machined multi-sensor can be symmetrically laid out on a die, thereby improving yield as well as improving the overall performance of the multi-sensor device.

Figure 1:
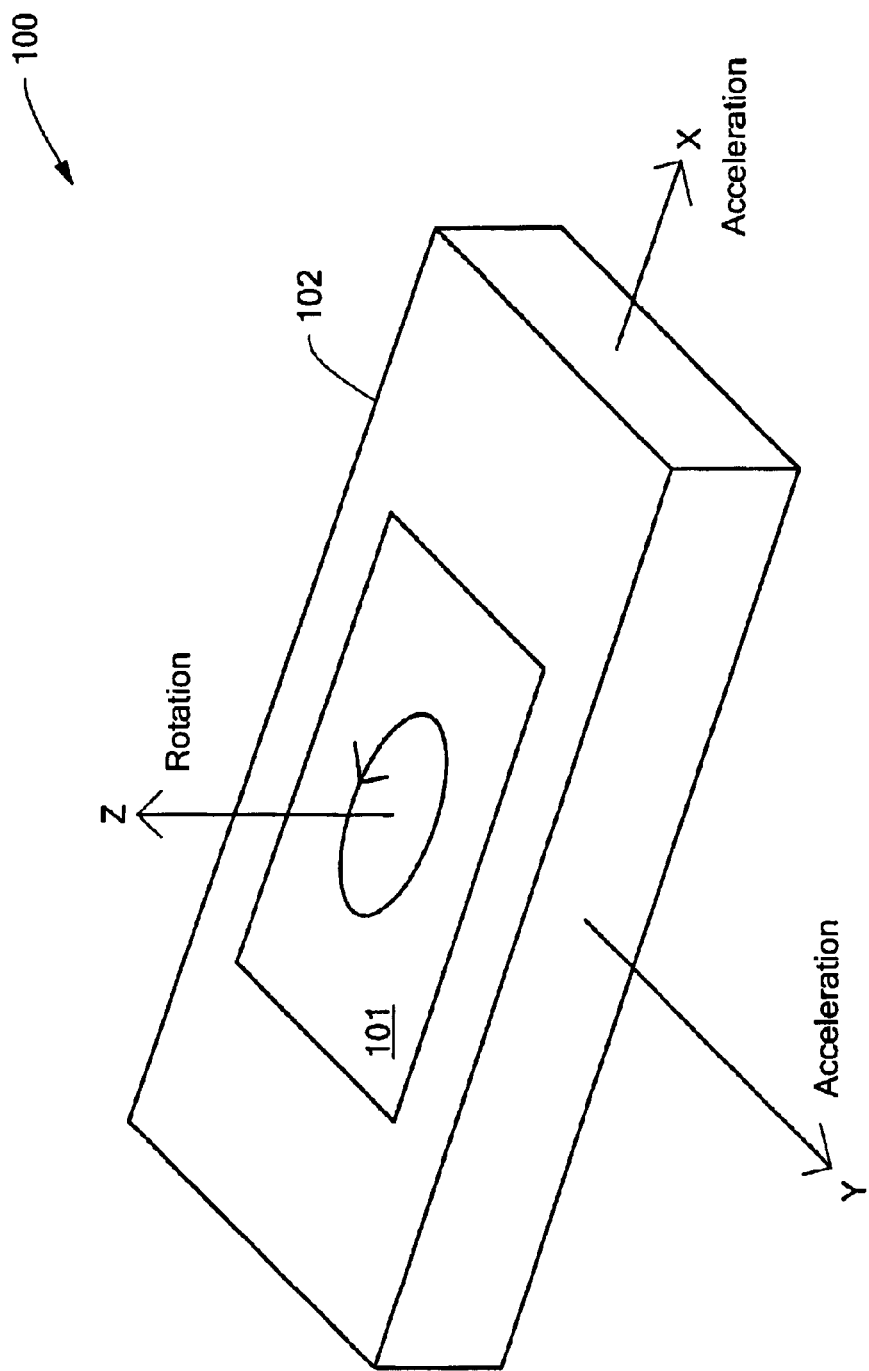
FIG. 1 is a conceptual perspective view of a silicon micro-machined multi-sensor according to the present invention.

FIG. 1 depicts a conceptual view of a micro-machined multi-sensor 100, in accordance with the present invention. The presently disclosed multi-sensor 100 comprises a substrate 102 such as a silicon substrate, which is subjected to any suitable bulk micro-machining process to form a Micro Electro Mechanical System (MEMS) multi-sensor device. As shown in FIG. 1, the MEMS multi-sensor 100 includes a sensor 101 having two associated mutually orthogonal acceleration-sensing axes X and Y disposed in the plane of the substrate 102, and one associated rotation-sensing axis Z perpendicular to the acceleration axes X and Y. The multi-sensor 100 is configured to provide two indications of acceleration sensing along the respective acceleration axes X and Y, and one indication of angular rate sensing relative to the rotation axis Z.

Figure 2:
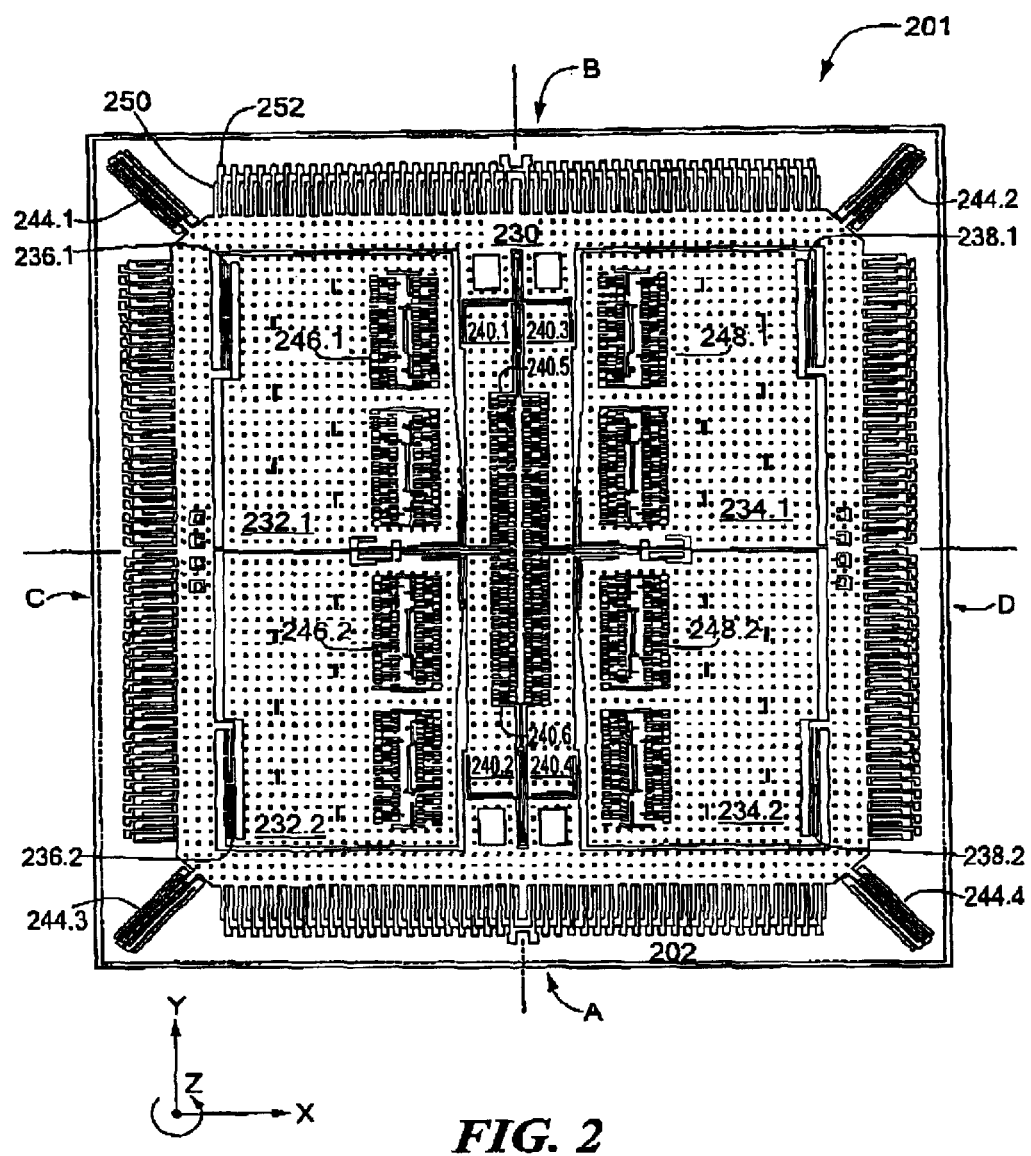
FIG. 2 is a plan view of a sensor included in the silicon micro-machined multi-sensor of FIG. 1.

FIG. 2 depicts an illustrative embodiment 201 of the sensor 101 included in the micro-machined multi-sensor 100 (see FIG. 1). In the illustrated embodiment, the sensor 201 includes a rigid accelerometer frame 230, and proof masses 232.1–232.2 and 234.1–234.2, formed on a substrate 202. The proof masses 232.1–232.2 are suspended from the rigid frame 230 by resonator flexures 236.1–236.2, respectively, and the proof masses 234.1–234.2 are suspended from the rigid frame by resonator flexures 238.1–238.2, respectively. Moreover, the rigid frame 230 is anchored to the substrate by accelerometer flexures 244.1–244.4, which are diagonally disposed on the substrate 202.

The sensor 201 further includes drive electrode structures 246.1–246.2 and 248.1–248.2, and acceleration sense electrode structures A–D. As shown in FIG. 2, the drive electrode structures 246.1–246.2 and 248.1–248.2 include respective pluralities of drive electrodes ("fingers"), which are disposed in parallel and interdigitated with one another. The drive electrode structures 246.1–246.2 are configured to exert electrostatic forces on the proof masses 232.1–232.2, respectively, and the drive electrode structures 248.1–248.2 are configured to exert electrostatic forces on the proof masses 234.1–234.2, respectively, in response to drive signals (not shown) comprising alternating voltages. It is understood that the drive electrode structures 246.1–246.2 and 248.1–248.2 may alternatively comprise electromagnetic drive structures configured to exert electromagnetic forces on the proof masses 232.1–232.2 and 234.1–234.2, respectively, in response to alternating current signals.

As further shown in FIG. 2, the acceleration sense electrode structures A–D include respective pluralities of sense electrodes ("fingers") that are disposed in parallel and interdigitated with one another. Specifically, the sense electrode structures A, B, C, and D include respective first sets of sense fingers integrally coupled to the rigid frame 230, and corresponding second sets of sense fingers fixed to the substrate 202. For example, in the event the sensor 201 is subjected to linear and/or rotational motion, the rigid frame 230 deflects relative to the substrate 202 in response to resulting linear acceleration and/or Coriolis forces. Because the rigid frame 230 and the first sets of sense fingers associated with the sense electrode structures A–D (see, e.g., the sense finger 250 associated with the sense electrode structure B) move with the rigid frame 230 as it deflects, while the second sets of sense fingers (see, e.g., the sense finger 252 associated with the sense electrode structure B) remain anchored to the substrate 202, the sense electrode structures A–D sense the deflection of the frame 230 by sensing the relative movement of the first and second sets of sense fingers, and produce sense signals A'–D' (see FIG. 3) having magnitudes proportional to the magnitude of the deflection. It should be appreciated that the sense electrode structures A, C, and D have sense finger configurations like the finger configuration of the sense electrode structure B.

The sensor 201 further includes a plurality of levers 240.1–240.4 suspended from the rigid frame 230, and drive electrode structures 240.5–240.6 for the levers 240.1–240.4. Specifically, the lever 240.1 is resiliently coupled between the proof mass 232.1 and the lever 240.3, the lever 240.2 is resiliently coupled between the proof mass 232.2 and the lever 240.4, the lever 240.3 is resiliently coupled between the proof mass 234.1 and the lever 240.1, and the lever 240.4 is resiliently coupled between the proof mass 234.2 and the lever 240.2. Further, the drive electrode structures 240.5–240.6 include respective pluralities of drive fingers disposed in parallel and interdigitated with one another. The drive electrode structure 240.5 is configured to exert electrostatic forces on the levers 240.1 and 240.3, and the drive electrode structure 240.6 is configured to exert electrostatic forces on the levers 240.2 and 240.4. It is understood that the drive electrode structures 240.5–240.6 may alternatively comprise respective electromagnetic drive structures. It is also understood that some drive electrodes may be put to the alternative use of providing a velocity signal, which gives feedback for the drive electronics and a reference for the Coriolis signal processing.

It is noted that the proof mass 232.1 is mechanically coupled to the proof mass 232.2 so that the proof masses 232.1–232.2 move substantially together as a single mass. Similarly, the proof mass 234.1 is mechanically coupled to the proof mass 234.2 so that the proof masses 234.1–234.2 move substantially together as a single mass. Further, the flexures 236.1–236.2 suspending the proof masses 232.1–232.2 from the rigid frame 230 are configured to constrain the proof masses 232.1–232.2 to move substantially only in the direction of the axis X relative to the frame 230. Similarly, the flexures 238.1–238.2 suspending the proof masses 234.1–234.2 from the rigid frame 230 are configured to constrain the proof masses 234.1–234.2 to move substantially only in the direction of the axis X relative to the frame 230. The levers 240.1–240.4 are configured to couple the motions of the proof masses 232.1–232.2 and 234.1–234.2 such that they oscillate as a single resonance. The advantage of providing such a coupling is described in U.S. Pat. No. 5,635,638 issued Jun. 3, 1997 entitled COUPLING FOR MULTIPLE MASSES IN A MICROMACHINED DEVICE, and U.S. Pat. No. 5,635,640 issued Jun. 3, 1997 entitled MICROMACHINED DEVICE WITH ROTATIONALLY VIBRATED MASSES, however the specific mechanization of the coupling described in these prior patents is different from that of the sensor 201 illustrated in FIG. 2. The flexures 244.1–244.4 anchoring the rigid frame 230 to the substrate 202 are configured to constrain the rigid frame 230 to allow rotational movement of the frame 230 relative to the substrate 202 for Coriolis sensing.

The diagonal flexures 244.1–244.4 form folded pairs so that, unlike single flexures arranged as diagonal spokes, they allow some translational motion. This relieves the stress in the deposited film used for surface micro-machining, and allows linear acceleration sensing along the X and Y axes. The Coriolis acceleration is generally much smaller than the linear acceleration to be sensed, so it is desirable to have the flexures 244.1–244.4 more compliant to rotational motion than along the X and Y axes. The desired ratio of compliance can be created by using the appropriate ratio of flexure length-to-fold separation.

It is further noted that the rigid frame 230, the proof masses 232.1–232.2 and 234.1–234.2, the drive electrode structures 246.1–246.2, 248.1–248.2, and 240.5–240.6, the acceleration sense electrode structures A–D, the levers 240.1–240.4, and the flexures 236.1–236.2, 238.1–238.2, and 244.1–244.4 are arranged in mirror image fashion on each side of a lateral axis of symmetry, and on each side of a vertical axis of symmetry, of the sensor 201. Accordingly, the sensor 201 can be symmetrically centered on a die (not shown) to reduce the adverse effects of die surface distortions. Moreover, employing the single rigid frame 230 in the sensor 201 reduces the overall size of the multi-sensor device.

Figure 3:
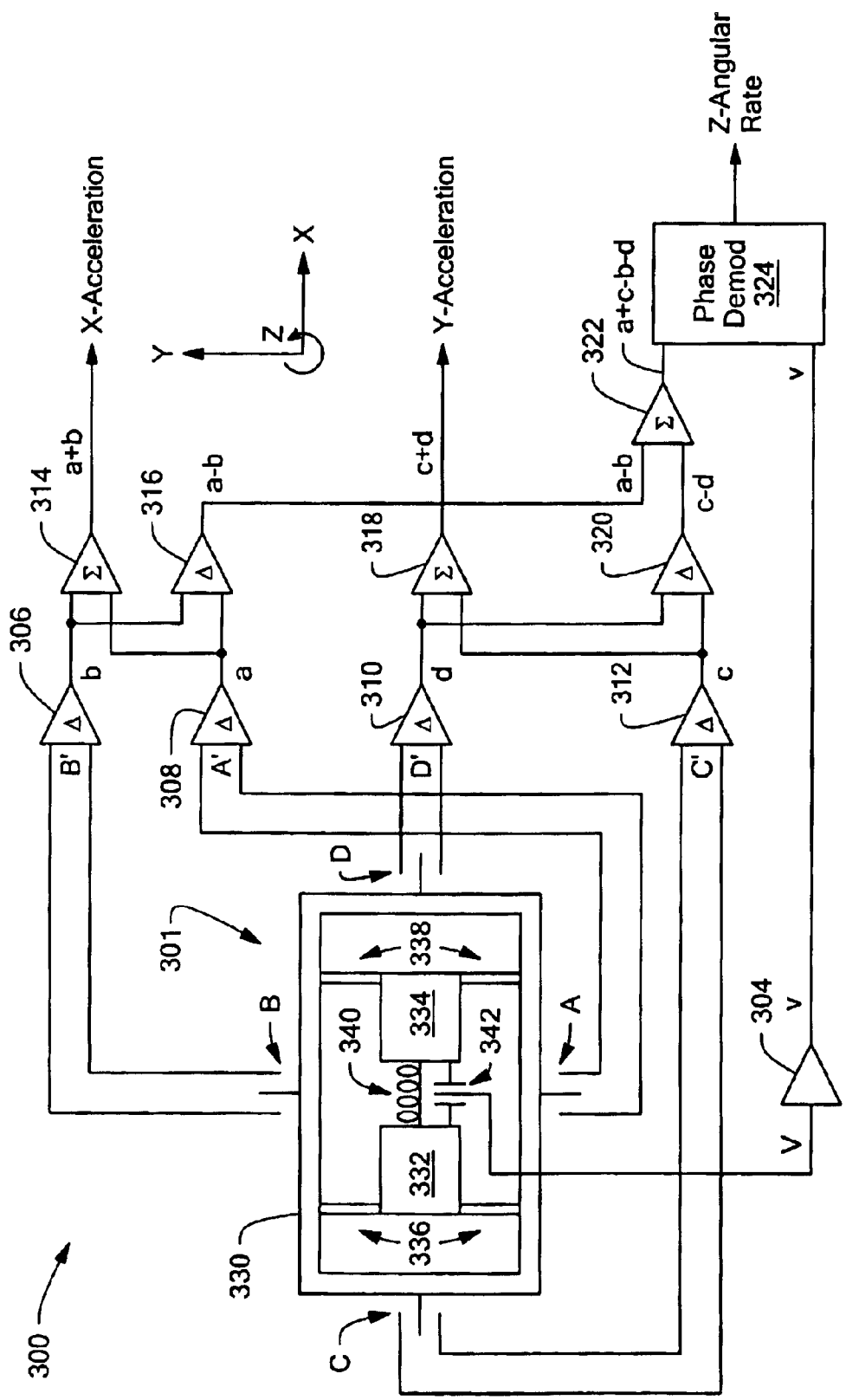
FIG. 3 is a schematic diagram of the silicon micro-machined multi-sensor of FIG. 1.

FIG. 3 depicts a schematic diagram of an illustrative embodiment 300 of the micro-machined multi-sensor 100 (see FIG. 1) according to the present invention. In the illustrated embodiment, the multi-sensor 300 includes a sensor 301, a transresistance amplifier 304, a plurality of difference amplifiers 306, 308, 310, 312, 316, and 320, a plurality of summing amplifiers 314, 318, and 322, and a phase demodulator 324. As described above, the proof masses 232.1–232.2 (see FIG. 2) are coupled together to move as a single mass, and the proof masses 234.1–234.2 (see FIG. 2) are similarly coupled together to move as a single mass. Accordingly, the sensor 301 includes a rigid accelerometer frame 330 representing the rigid frame 230 (see FIG. 2), a first proof mass 332 representing the proof masses 232.1–232.2, and a second proof mass 334 representing the proof masses 234.1–234.2.

Specifically, the first proof mass 332 is suspended from the rigid frame 330 by resonator flexures 336, which are representative of the flexures 236.1–236.2 (see FIG. 2), and the second proof mass 334 is suspended from the rigid frame 330 by resonator flexures 338, which are representative of the flexures 238.1–238.2 (see FIG. 2). Further, the rigid frame 330 is anchored to a substrate (e.g., the substrate 202, see FIG. 2) by a plurality of accelerometer flexures (e.g., the flexures 244.1–244.4, see FIG. 2).

The sensor 301 (see FIG. 3) further includes a resilient member 340 representing the levers and drive electrode structures 240.1–240.6 (see FIG. 2). The resilient member 340 resiliently interconnects the first proof mass 332 and the second proof mass 334. Moreover, the sensor 301 includes drive electrode structures (e.g., the drive electrode structures 246.1–246.2 and 248.1–248.2, see FIG. 2) for vibrating the proof masses 332 and 334, and acceleration sense electrode structures A, B, C, and D representing the sense electrode structures A–D of FIG. 2.

Specifically, the drive electrode structures are configured to vibrate the respective first and second proof masses 332 and 334 simultaneously at mechanical resonance, and the resilient member 340 is configured to move the proof masses 332 and 334 in antiphase (i.e., 180° out-of-phase) along a vibration axis, which in the presently disclosed embodiment is parallel to the acceleration axis X. The diametrically opposed acceleration sense electrode structures A–B are disposed along the acceleration axis Y and coupled to the rigid frame 330, and the diametrically opposed acceleration sense electrode structures C–D are disposed along the acceleration axis X and coupled to the rigid frame 330. The respective sense electrode structures A–D are configured to produce electrically independent sense signals A', B', C', and D', respectively.

Those of ordinary skill in the art will appreciate that as the proof masses 332 and 334 vibrate along the vibration axis, while the rigid frame 330 rotates about the rotation axis Z, each of the proof masses 332 and 334 undergoes Coriolis acceleration in the plane defined by the acceleration axes X and Y. Further, because the proof masses 332 and 334 vibrate in antiphase, the respective proof masses 332 and 334 undergo Coriolis acceleration in opposite directions. As a result, apparent Coriolis forces are applied to the proof masses 332 and 334, deflecting the proof masses 332 and 334 in opposing directions within the plane of the acceleration axes X and Y.

Accordingly, the responses of the proof masses 332 and 334 to Coriolis acceleration relative to the rotation axis Z are in antiphase, while the responses of the proof masses 332 and 334 to linear acceleration relative to the acceleration axes X and Y are in phase. The electrically independent acceleration sense signals A', B', C', and D' are therefore suitably added and/or subtracted to extract information corresponding to the linear acceleration (i.e., the acceleration sensing information), and to extract information corresponding to the Coriolis acceleration (i.e., the angular rate sensing information). For example, a first set of electrical restoring forces (not shown) may be employed to balance the forces of linear acceleration, and a second set of electrical restoring forces (not shown) may be employed to balance the forces of Coriolis acceleration. Further, the respective sense electrode structures A, B, C, and D may be configured to produce the electrically independent acceleration sense signals A', B', C', and D' based on the magnitudes of the electrical restoring forces.

Alternatively, the spring forces from the deflection of the flexures 244.1–244.4 attaching the frame to the substrate may be used to balance the Coriolis forces and the structures A, B, C, and D used to sense those deflections. If the structural film used for surface micro-machining is polysilicon, then the deflection of the flexures is linearly related to the forces so that it is uneconomical to introduce the complication of electrical restoring forces.

Specifically, the difference amplifier 306 is configured to receive the differential sense signal B' from the sense electrode structure B, and to provide a corresponding sense signal b to the summing amplifier 314 and the difference amplifier 316. Similarly, the difference amplifier 308 is configured to receive the differential sense signal A' from the sense electrode structure A, and to provide a corresponding sense signal a to the summing amplifier 314 and the difference amplifier 316. Further, the difference amplifier 310 is configured to receive the differential sense signal D' from the sense electrode structure D, and to provide a corresponding sense signal d to the summing amplifier 318 and the difference amplifier 320, and the difference amplifier 312 is configured to receive the differential sense signal C' from the sense electrode structure C, and to provide a corresponding sense signal c to the summing amplifier 318 and the difference amplifier 320.

The summing amplifier 314 is configured to add the sense signals a and b, and to produce the sum of the sense signals a+b, which contains information pertaining to the acceleration sensing along the acceleration axis X ("X-Acceleration"). Similarly, the summing amplifier 318 is configured to add the sense signals c and d, and to produce the sum of the sense signals c+d, which contains information pertaining to the acceleration sensing along the acceleration axis Y ("Y-Acceleration").

Further, the difference amplifier 316 is configured to subtract the sense signals a and b, and to provide the difference of the sense signals a–b to the summing amplifier 322. Similarly, the difference amplifier 320 is configured to subtract the sense signals c and d, and to provide the difference of the sense signals c–d to the summing amplifier 322. Moreover, the summing amplifier 322 is configured to add the sense signals a–b and c–d, and to provide the sum a+c–b–d to the phase demodulator 324. The sense signal a+c–b–d includes information pertaining to the angular rate sensing relative to the rotation axis Z ("Z-Rotation"). It is noted, however, that the sense signal a+c–b–d may also include at least some information pertaining to the acceleration sensing along one or both of the acceleration axes X and Y. Accordingly, the phase demodulator 324 is configured to suppress the acceleration information in the gyroscopic sense signal a+c–b–d.

Specifically, the phase demodulator 324 demodulates the gyroscopic (sense signal a+c–b–d against a velocity sense signal V, which is in phase with the vibration velocity of the proof masses 332 and 334 and asynchronous with the proof mass acceleration. As shown in FIG. 3, the sensor 301 includes a velocity sense electrode structure 342 configured to provide the velocity sense signal V (a current signal) to the transresistance amplifier 304, which converts the current signal to a corresponding voltage signal v. The velocity sense electrode structure 342 senses the vibration velocity of the proof masses 332 and 334 by sensing the relative movement of electrodes coupled to the proof masses 332 and 334, and electrodes anchored to the substrate, and produces the velocity sense signal V, which is in phase with the vibration velocity. Next, the transresistance amplifier 304 provides the voltage signal v as a phase reference to the phase demodulator 324. Because the velocity sense signal V is asynchronous with the acceleration signals a+b and c+d, the acceleration information at the output of the summing amplifier 322 is suppressed by the phase demodulator 324, thereby increasing the gyroscopic Signal-to-Noise Ratio (SNR) at the phase demodulator output.

It is appreciated that in order to sense static deflections of the accelerometer electrodes A, B, C, and D by differential capacitance, an alternating voltage is provided to the frame 330 and the signals are synchronously demodulated against that voltage. Such demodulation may be performed either in the difference amplifiers 306, 308, 310, and 312 or in the summing amplifiers 314, 318, and 322. To improve sensitivity, the alternating voltage is at as high a frequency as is practical. Further, to prevent errors from relative frequency drift, the alternating voltage is preferably related to the velocity signal using a phase-locked loop. It is also noted that although the various amplifiers are discretely depicted in FIG. 3 for clarity of discussion, the amplifiers may alternatively be combined into a more efficient arrangement of transistors in an integrated circuit while preserving their overall function. Specifically, if a continuous time (amplifier based) implementation is employed, the integrity of the process may be preserved by maintaining differential signal paths as far as the phase demodulator. If a discrete time (digital) approach is employed, then it may be more efficient to merge the addition, subtraction, demodulation, and filtering processes.

A method of operating the presently disclosed silicon micro-machined multi-sensor is illustrated by reference to FIG. 4. As depicted in step 402, the two proof masses included in the multi-sensor are vibrated in antiphase along the vibration axis, while the multi-sensor is rotated about the rotation axis. It is understood that the vibration axis is in the plane of the substrate of the multi-sensor, and the rotation axis is perpendicular to both the vibration axis and the multi-sensor substrate. Next, the differential sense signals A' and B' produced by the acceleration sense electrode structures A and B of the multi-sensor are converted, as depicted in step 404, to sense signals a and b, respectively. Similarly, the differential sense signals C' and D' produced by the acceleration sense electrode structures C and D are converted, as depicted in step 406, to sense signals c and d, respectively. The acceleration sense electrode structures A and B are disposed along the acceleration axis X, which is in the plane of the substrate and perpendicular to the vibration axis. Further, the acceleration sense electrode structures C and D are disposed along the acceleration axis Y, which is in the plane of the substrate and perpendicular to the acceleration axis X. The sense signals a and b are then added, as depicted in step 408, to produce the sum of the sense signals a+b containing information pertaining to the acceleration sensing along the acceleration axis X (X-Acceleration). Similarly, the sense signals c and d are added, as depicted in step 410, to produce the sum of the sense signals c+d containing information pertaining to the acceleration sensing along the acceleration axis Y (Y-Acceleration). Next, the sense signals a and b are subtracted, as depicted in step 412, to produce the difference of the sense signals a−b. Similarly, the sense signals c and d are subtracted, as depicted in step 414, to produce the difference of the sense signals c−d. The sense signals a−b and c−d are then added, as depicted in step 416, to produce the sum of the sense signals (a−b)+(c−d) including information pertaining to the angular rate sensing relative to the rotation axis Z (Z-Rotation). Finally, the acceleration information that may be included in the gyroscopic sense signal a+c−b−d is optionally suppressed, as depicted in step 418, to increase the gyroscopic SNR.

Figure 4:
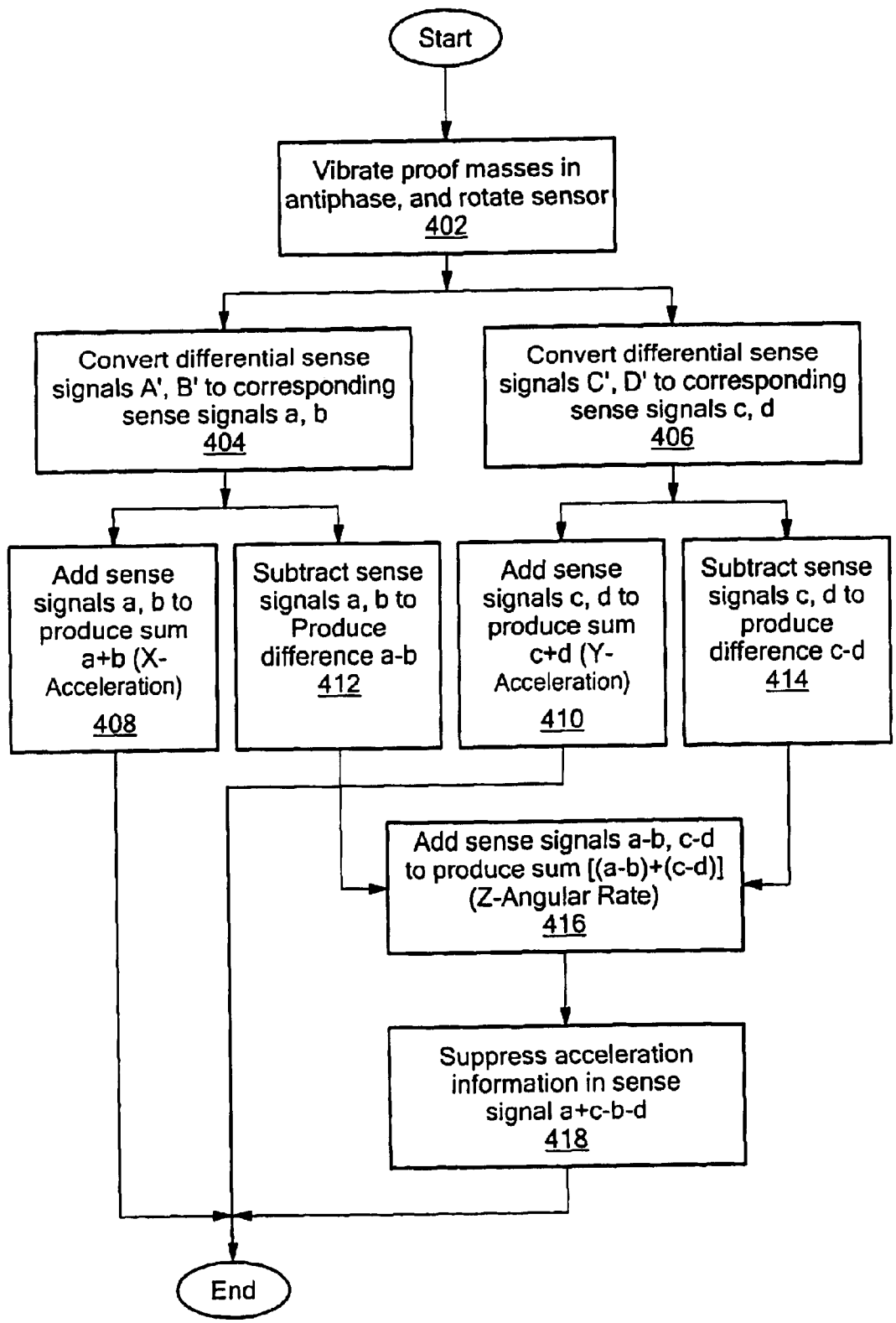
FIG. 4 is a flow diagram of a method of operating the silicon micro-machined multi-sensor of FIG. 1.

It will be appreciated by those of ordinary skill in the art of signal processing that the algorithm depicted in FIG. 4 is not the only one that will produce the desired result, and that other suitable discrete time implementations may be employed. For example, the order of addition, subtraction, and demodulation depicted in the steps 412, 414, 416, and 418 may be interchanged or merged.

It will further be appreciated by those of ordinary skill in the art that modifications to and variations of the above-described micro-machined multi-sensor providing 2-axes of acceleration sensing and 1-axis of angular rate sensing may be made without departing from the inventive concepts disclosed herein. Accordingly, the invention should not be viewed as limited except as by the scope and spirit of the appended claims.

What is claimed is:

1. A multi-sensor, comprising:
   a substantially planar accelerometer frame;
   a first proof mass coupled to the frame;
   a second proof mass coupled to the frame;
   a first pair of diametrically opposed acceleration sense electrode structures coupled to the frame and disposed along a first acceleration axis; and
   a second pair of diametrically opposed acceleration sense electrode structures coupled to the frame and disposed along a second acceleration axis, the second acceleration axis being perpendicular to the first acceleration axis,
   wherein the first and second proof masses are configured to vibrate in antiphase along a vibration axis, the vibration axis being in a plane defined by the acceleration axes, and
   wherein each acceleration sense electrode structure is configured to produce a respective acceleration sense signal, each sense signal being electrically independent of the remaining sense signals.

2. The multi-sensor of claim 1 further including a resilient member resiliently coupling the first proof mass and the second proof mass.

3. The multi-sensor of claim 1 further including a signal processing unit configured to extract information pertaining to acceleration sensing along the first and second acceleration axes, and to extract information pertaining to angular rate sensing relative to a rotation axis perpendicular to the first and second acceleration axes.

4. The multi-sensor of claim 1 further including a first amplifier configured to receive a differential sense signal from one of the first pair of acceleration sense electrode structures and to produce a first sense signal, and a second amplifier configured to receive a differential sense signal from the other of the first pair of acceleration sense electrode structures and to produce a second sense signal.

5. The multi-sensor of claim 4 further including a third amplifier configured to receive the first and second sense signals, and to produce a third sense signal comprising the sum of the first and second sense signals, the third sense signal including information pertaining to acceleration sensing along the first acceleration axis.

6. The multi-sensor of claim 1 further including a first amplifier configured to receive a differential sense signal from one of the second pair of acceleration sense electrode structures and to produce a first sense signal, and a second amplifier configured to receive a differential sense signal from the other of the second pair of acceleration sense electrode structures and to produce a second sense signal.

7. The multi-senior of claim 6 further including a third amplifier configured to receive the first and second sense signals, and to produce a third sense signal comprising the sum of the first and second sense signals, the third sense signal including information pertaining to acceleration sensing along the second acceleration axis.

8. The multi-sensor of claim 1 further including a first amplifier configured to receive a differential sense signal from one of the first pair of acceleration sense electrode structures and to produce a first sense signal, a second amplifier configured to receive a differential sense signal from the other of the first pair of acceleration sense electrode structures and to produce a second sense signal, a third amplifier configured to receive a differential sense signal from one of the second pair of acceleration sense electrode structures and to produce a third sense signal, and a fourth amplifier configured to receive a differential sense signal from the other of the second pair of acceleration sense electrode structures and to produce a fourth sense signal.

9. The multi-sensor of claim 8 further including a fifth amplifier configured to receive the first and second sense signals and to produce a fifth sense signal comprising the difference of the first and second sense signals, and a sixth amplifier configured to receive the third and fourth sense signals and to produce a sixth sense signal comprising the difference of the third and fourth sense signals.

10. The multi-sensor of claim 9 further including a seventh amplifier configured to receive the fifth and sixth sense signals, and to produce a seventh a sense signal comprising the sum of the fifth and sixth sense signals, the seventh sense signal including information pertaining to angular rate sensing relative to a rotation axis, the rotation axis being perpendicular to the first and second acceleration axes.

11. The multi-sensor of claim 10 further including a velocity sense electrode structure configured to produce a velocity sense signal, the velocity sense signal being in phase with a vibration velocity of the first and second proof masses and asynchronous with a linear acceleration of the first and second proof masses.

12. The multi-sensor of claim 11 further including a phase demodulator configured to receive the seventh sense signal and the velocity sense signal, and to produce an eighth sense signal including information pertaining to angular rate sensing relative to the rotation axis.

13. The multi-sensor of claim 1 wherein at least the frame and the first and second proof masses are micro-machined on a substrate, the first and second acceleration axes being in the plane of the substrate.

14. A method of operating a multi-sensor, comprising the steps of:
vibrating in antiphase a first proof mass and a second proof mass along a vibration axis by a drive electrode structure, the first proof mass and the second proof mass being coupled to an accelerometer frame;
producing respective first accelerometer sense signals by a first pair of diametrically oppose acceleration sense electrode structures coupled to the frame and disposed along a first acceleration axis; and
producing respective second accelerometer sense signals by a second pair of diametrically oppose acceleration sense electrode structures coupled to the frame and disposed along a second acceleration axis, the second acceleration axis being perpendicular to the first acceleration axis,
wherein each sense signal produced in the first and second producing steps is electrically independent of the remaining sense signals.

15. The method of claim 14 further including the steps of extracting information pertaining to acceleration sensing along the first and second acceleration axes by a signal processing unit, and extracting information pertaining to angular rate sensing relative to a rotation axis perpendicular to the first and second acceleration axes by the signal processing unit.

16. The method of claim 14 further including the steps of receiving a differential sense signal from one of the first pair of acceleration sense electrode structures by a first amplifier, producing a first sense signal by the first amplifier, receiving a differential sense signal from the other of the first pair of acceleration sense electrode structures by a second amplifier, and producing a second sense signal by the second amplifier.

17. The method of claim 16 further including the steps of receiving the first and second sense signals by a third amplifier, and producing a third sense signal comprising the sum of the first and second sense signals by the third amplifier, the third sense signal including information pertaining to acceleration sensing along the first acceleration axis.

18. The method of claim 14 further including the steps of receiving a differential sense signal from one of the second pair of acceleration sense electrode structures by a first amplifier, producing a first sense signal by the first amplifier, receiving a differential sense signal from the other of the second pair of acceleration sense electrode structures by a second amplifier, and producing a second sense signal by the second amplifier.

19. The method of claim 18 further including the steps of receiving the first and second sense signals by a third amplifier, and producing a third sense signal comprising the sum of the first and second sense signals by the third amplifier, the third sense signal including information pertaining to acceleration sensing along the second acceleration axis.

20. The method of claim 14 further including the steps of receiving a differential sense signal from one of the first pair of acceleration sense electrode structures by a first amplifier, producing a first sense signal by the first amplifier, receiving a differential sense signal from the other of the first pair of acceleration sense electrode structures by a second amplifier, producing a second sense signal by the second amplifier, receiving a differential sense signal from one of the second pair of acceleration sense electrode structures by a third amplifier, producing a third sense signal by the third amplifier, receiving a differential sense signal from the other of the second pair of acceleration sense electrode structures by a fourth amplifier, and producing a fourth sense signal by the fourth amplifier.

21. The method of claim 20 further including the steps of receiving the first and second sense signals by a fifth amplifier, producing a fifth sense signal comprising the difference of the first and second sense signals by the fifth amplifier, receiving the third and fourth sense signals by a sixth amplifier, and producing a sixth sense signal comprising the difference of the third and fourth sense signals by the sixth amplifier.

22. The method of claim 21 further including the steps of receiving the fifth and sixth sense signals by a seventh amplifier, and producing a seventh sense signal comprising the sum of the fifth and sixth sense signal by the seventh amplifier, the seventh sense signal including information pertaining to angular rate sensing relative to a rotation axis, the rotation axis being perpendicular to the first and second acceleration axes.

23. The method of claim 22 further including the step of producing a velocity sense signal by a velocity sense electrode structure, the velocity sense signal being in phase with a vibration velocity of the first and second proof masses, and asynchronous with an acceleration of the first and second proof masses.

24. The method of claim 23 further including the steps of receiving the seventh sense signal and the velocity sense signal by a phase demodulator, and producing an eighth sense signal including information pertaining to angular rate sensing relative to the rotation axis by the phase demodulator.

25. The method of claim 14 further including the step of micro-machining at least the frame and the first and second proof masses on a substrate, the first and second acceleration axes being in the plane of the substrate.

* * * * *

UNITED STATES PATENT AND TRADEMARK OFFICE
CERTIFICATE OF CORRECTION

PATENT NO. : 6,845,665 B2
DATED : January 25, 2005
INVENTOR(S) : John A. Geen

It is certified that error appears in the above-identified patent and that said Letters Patent is hereby corrected as shown below:

<u>Column 10,</u>
Line 38, "senior" should read -- sensor --.

Signed and Sealed this

Twentieth Day of September, 2005

JON W. DUDAS
*Director of the United States Patent and Trademark Office*